United States Patent [19]

Katayama

[11] Patent Number: 4,671,136

[45] Date of Patent: Jun. 9, 1987

[54] POWER TRANSMISSION FOR FOUR-WHEEL DRIVE VEHICLE

[75] Inventor: Nobuaki Katayama, Toyota, Japan

[73] Assignee: Toyota Jidosha Kabushiki Kaisha, Toyota, Japan

[21] Appl. No.: 780,316

[22] Filed: Sep. 26, 1985

[30] Foreign Application Priority Data

Sep. 27, 1984 [JP] Japan ................................. 59-202442
Dec. 24, 1984 [JP] Japan ........................... 59-201815[U]

[51] Int. Cl.$^4$ ............................ F16H 1/40; F16H 3/08
[52] U.S. Cl. ...................................... 74/710.5; 74/713; 74/373; 180/249
[58] Field of Search ................. 74/373, 374, 681, 713, 74/710.5, 711; 180/248, 249, 250

[56] References Cited

U.S. PATENT DOCUMENTS

| | | | |
|---|---|---|---|
| 860,952 | 7/1907 | White | 74/713 |
| 1,247,494 | 11/1917 | Berquist | 74/713 |
| 1,812,801 | 6/1931 | Nus | 180/248 |
| 2,073,029 | 3/1937 | Roller | 74/713 |
| 2,395,108 | 2/1946 | Donley et al. | 74/713 |
| 3,378,093 | 4/1968 | Hill | 180/249 |
| 4,305,313 | 12/1981 | Konkle | 74/713 |

Primary Examiner—Lawrence Staab
Attorney, Agent, or Firm—Oblon, Fisher, Spivak, McClelland & Maier

[57] ABSTRACT

A power transmission for a four-wheel drive vehicle includes a change-speed gearing mounted within a transmission casing, and an intermediate differential unit assembled within the transmission casing and drivingly connected to an output shaft of the change-speed gearing to be applied with a driving torque through the change-speed gearing for transmitting the driving torque to a first drive shaft for front-wheel drive and to a second drive shaft for rear-wheel drive. The differential unit comprises a differential casing rotatably mounted within the transmission casing and drivingly connected to the output shaft of the change-speed gearing, a pair of pinion gears rotatably mounted within the differential casing, a plurality of first side gears concentrically mounted within the differential casing for relative rotation and being meshed with the pinion gears, the first side gears being formed in different diameter and arranged to be drivingly connected to one of the drive shafts, a second side gear rotatably mounted within the differential casing, the second side gear being meshed with the pinion gears and drivingly connected to the other drive shaft, and a shift mechanism for selectively connecting the first side gears to the one of the drive shafts.

5 Claims, 6 Drawing Figures

POWER TRANSMISSION FOR FOUR-WHEEL DRIVE VEHICLE

BACKGROUND OF THE INVENTION

The present invention relates to a power transmission for an automotive vehicle, and more particularly to a power transmission for a four-wheel drive vehicle which is adapted to a prime mover of the vehicle to transmit therethrough a driving torque of the prime mover to a first drive shaft for front-wheel drive and to a second drive shaft for rear-wheel drive.

As one of conventional power transmissions of this kind, there has been proposed a power transmission which includes a transmission casing arranged to be secured to a prime mover of the vehicle, a change-speed gearing mounted within the transmission casing and drivingly connected to an output shaft of the prime mover, and an intermediate differential unit mounted within the transmission casing and drivingly connected to an output shaft of the change-speed gearing to be applied with a driving torque from the prime mover through the change-speed gearing for transmitting the driving torque to a first drive shaft for front-wheel drive and to a second drive shaft for rear-wheel drive. The intermediate differential unit includes a differential raging rotatably mounted within the transmission casing, a pair of pinion gears rotatably mounted within the differential casing, and a pair of side gears rotatably mounted within the differential casing and being in meshing engagement with the pinion gears and respectively connected to the first and second drive shafts.

In such a conventional intermediate differential unit as described above, the side gears are formed in general in the same diameter to equally transmit the driving torque to the first and second drive shafts. It is, however, noted that the distribution ratio of the driving torque to the drive shafts should be changed in accordance with a road condition to ensure stable maneuverability of the vehicle. For example, if the distribution ratio of the driving torque is determined to ensure stable maneuverability of the vehicle on a road of low frictional coefficient, there will occur understeer of the vehicle on a road of high frictional coefficient. If the distribution ratio of the driving torque is determined to ensure stable maneuverability of the vehicle on a road of high frictional coefficient, traction of the vehicle will become insufficient on a road of low frictional coefficient. For the above reason, an auxiliary transmission is adpated to the intermediate differential unit to change the distribution ratio of the driving torque in accordance with a road condition. Such arrangement of the auxiliary transmission, however, results in increase of the size and weight of the power transmission assembly.

SUMMARY OF THE INVENTION

It is, therefore, a primary object of the present invention to provide an improved power transmission wherein the intermediate differential unit acts to change the distribution ratio of the driving torque in accordance with a road condition without provision of any auxiliary transmission so as to ensure stable maneuverability of the vehicle on various roads.

Another object of the present invention is to provide an improved power transmission wherein the intermediate differential unit can be constructed in a relatively small size.

According to the present invention, the above objects are accomplished by providing a power transmission which includes a transmission casing arranged to be secured to a cylinder block of a prime mover of the vehicle, a change-speed gearing mounted within the transmission casing and having an input shaft drivingly connected to an output shaft of the prime mover, and an intermediate differential unit assembled within the transmission casing and drivingly connected to an output shaft of the change-speed gearing to be applied with a driving torque from the prime mover through the change-speed gearing for transmitting the driving torque to a first drive shaft for front-wheel drive and to a second drive shaft for rear-wheel drive. The intermediate differential unit comprises a differential casing rotatably mounted within the transmission casing and drivingly connected to the output shaft of the change-speed gearing, a pinion gear rotatably mounted within the differential casing, a plurality of first side gears concentrically mounted within the differential casing for relative rotation and being in meshing engagement with the pinion gear, the first side gears being formed in different diameter and arranged to be drivingly connected to one of the drive shafts, a second side gear rotatably mounted within the differential casing, the second side gear being in meshing engagement with the pinion gear and drivingly connected to the other drive shaft, and a shift mechanism for selectively connecting the first side gears to the one of the drive shafts.

BRIEF DESCRIPTION OF THE DRAWINGS

Additional objects, features and advantages of the present invention will become more readily apparent from the following detailed description of preferred embodiments thereof when taken together with the accompanying drawings, in which.

DETAILED DESCRIPTION OF THE PREFERRED EMBODIMENTS

Figure 1:
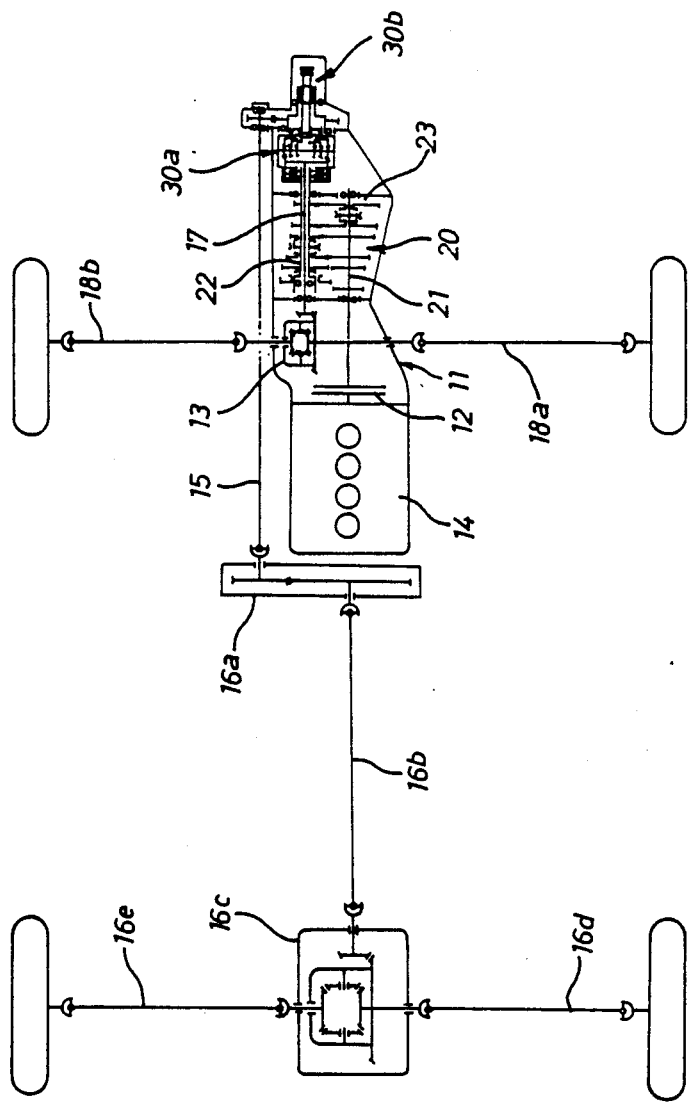
FIG. 1 is a schematic illustration of a four-wheel drive vehicle equipped with a power transmission in accordance with the present invention.
Figure 2:
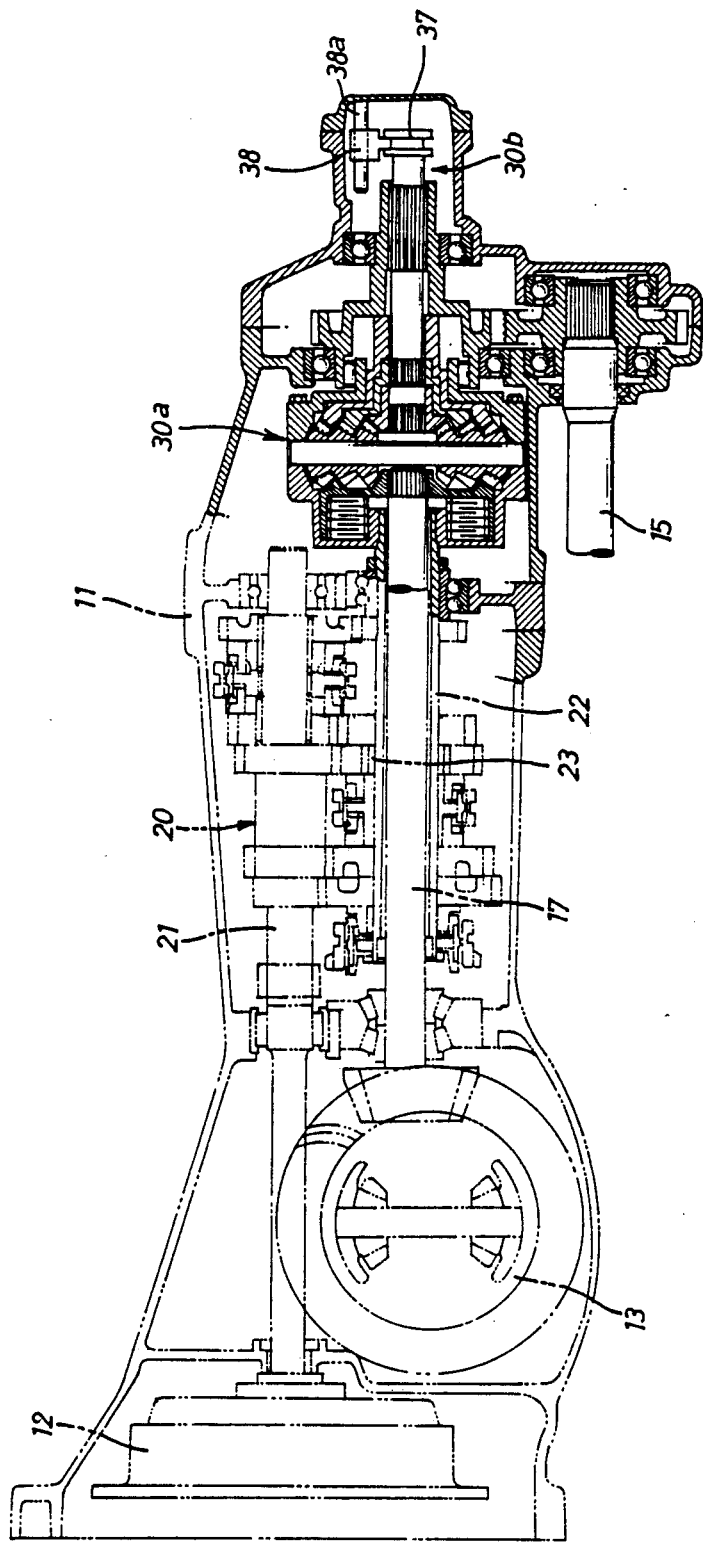
FIG. 2 is a sectional view of an intermediate differential unit assembled within the power transmission of FIG. 1.

Referring now to the drawings, particularly in FIG. 1, there is schematically illustrated a four-wheel drive vehicle which is equipped with a prime mover 14 at an intermediate portion thereof. A power transmission of the present invention includes a transmission casing 11 secured to the cylinder block of prime mover 14 to contain therein a clutch 12, a differential unit 13 for rear-wheel drive, a change-speed gearing 20, an intermediate differential unit 30a, and a shift mechanism 30b. As is illustrated in FIG. 2, the change-speed gearing 20 is in the form of a manual transmission which comprises an input shaft 2; coaxially connected to an output shaft of the prime mover 14 through the clutch 12, an output hollow shaft 22 arranged in parallel with the input shaft 21, and change-speed gears 23 respectively mounted on the input and output shafts 21 and 22 for selectively establishing a forward drive power train or a reverse drive power train. The output hollow shaft 22 is drivingly connected to a drive shaft 15 for front-wheel drive by way of the intermediate differential unit 30a and is further drivingly connected to a drive pinion shaft 17 for rear-wheel drive by way of the intermediate differential unit 30a.

As shown in FIG. 1, the drive shaft 15 is arranged in parallel with the input and output shafts 21 and 22 and is drivingly connected to a pair of front axles 16d and 16e by way of an inversion mechanism 16a, a propeller shaft 16b, and a differential unit 16c for front-wheel drive. The drive pinion shaft 17 is disposed within the output hollow shaft 22 and is drivingly connected to a pair of rear axles 18a and 18b by way of the differential unit 13 for rear-wheel drive. In operation of the power transmission, the input shaft 21 is applied with a driving torque from the prime mover 14 through the clutch 12 to drive the output shaft 22 through an established drive power train of the change-speed gears 23. The driving torque of output shaft 22 is distributed by the intermediate differential unit 30a to drive the drive shaft 15 and the drive pinion shaft 17.

Figure 3:
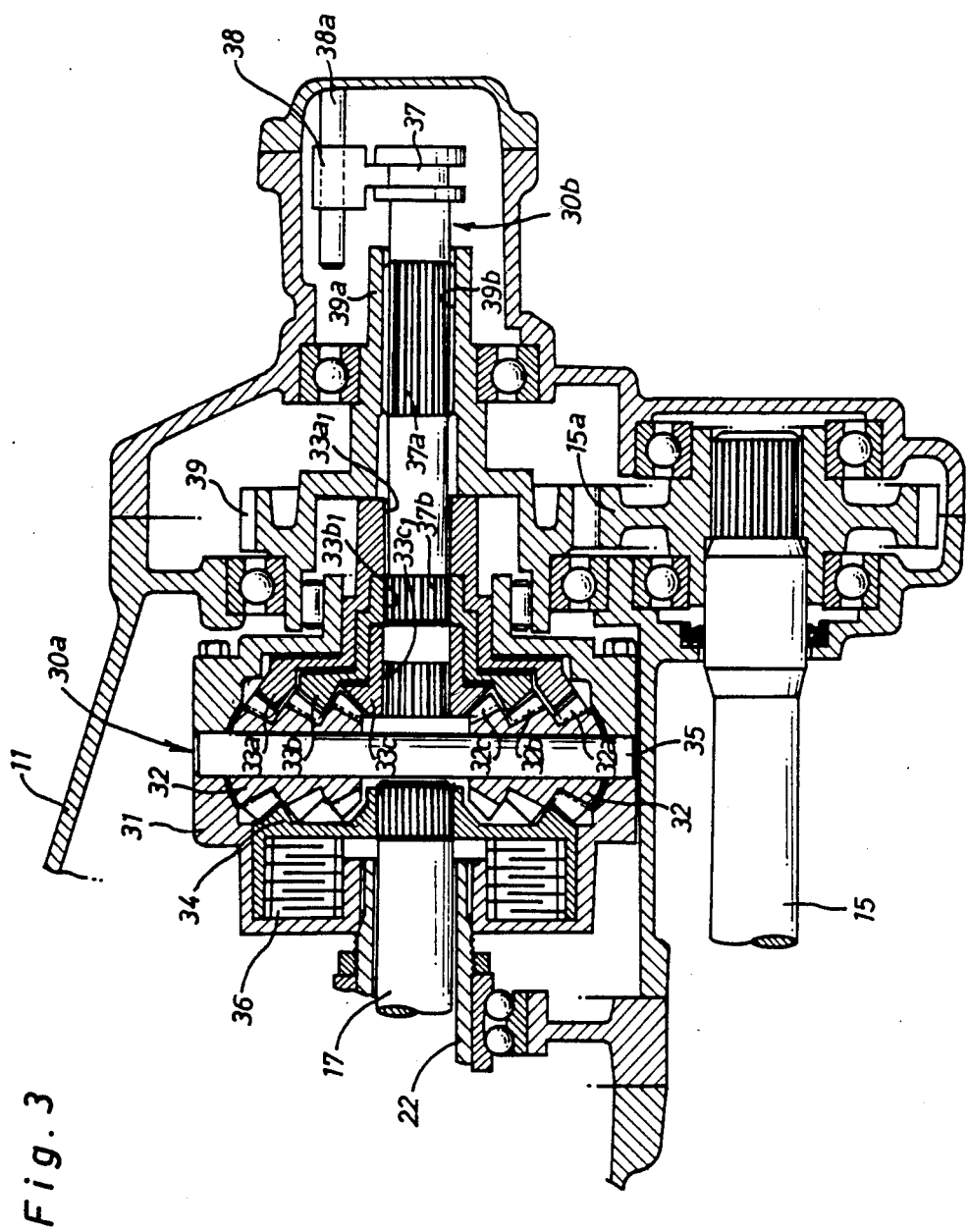
FIG. 3 is an enlarged sectional view of the intermediate differential unit of FIG. 2.

As is illustrated in FIG. 3, the intermediate differential unit 30a comprises a differential casing 31, a pair of pinion gears 32, 32, three side gears 33a, 33b, 33c for front-wheel drive, and a side gear 34 for rear-wheel drive. The differential casing 31 has one end fixed to the outer end of output shaft 22 and the other end rotatably supported from the transmission casing 11. The pinion gears 32 each are contained within the casing 31 and rotatably mounted on a pinion shaft 35 carried on the casing 31. The pinion gears 32 each are integrally formed with three stepped toothed portions 32a, 32b and 32c which are arranged in an axial direction of the pinion shaft 35. The side gears 33a, 33b and 33c for front-wheel drive are formed in different diameter and mounted concentrically within the casing 31 for relative rotation. The side gears 33a, 33b, 33c are in meshing engagement with the respective toothed portions 32a, 32b, 32c of pinion gears 32. The side gear 34 for rear-wheel drive is rotatably mounted within the casing 31 and fixedly mounted on the other end of drive pinion shaft 17. The side gear 34 is in meshing engagement with the outermost toothed portion 32a of pinion gear 32. Arranged between the casing 31 and the side gear 34 is a frictional restriction mechanism 36 which is adapted to restrict excessive relative rotation between the casing 31 and the side gear 14.

The shift mechanism 30b includes a slide shaft 37 arranged to be shifted by a lever 38. The slide shaft 37 is slidably disposed within sleeve portions of the side gears 33a, 33b, 33c through a sleeve portion 39a of an output gear 39. The slide shaft 37 is formed thereon with axially spaced outer splines 37a and 37b, the former spline 37a being permanently engaged with an inner spline 39b of the sleeve portion 39a of output gear 39, and the latter spline 37b being arranged to be selectively engaged with respective inner splines $33a_1$, $33b_1$, $33c_1$ of the side gears 33a, 33b, 33c. The output gear 39 is rotatably supported from the transmission casing 11 and is permanently in meshing engagement with an input gear 15a which is rotatably supported from the transmission casing 11 and fixed to the drive shaft 15. The lever 38 is slidably mounted on an axial support shaft 38a fixed to the transmission casing 11 and operatively connected through an appropriate linkage (not shown) to a manual shift lever which is arranged in the vehicle compartment to be operated by an operator.

In operation of the intermediate differential unit 30a, the casing 31 is rotated by the driving torque applied thereto from the output shaft 22 of change-speed gearing 20 to drive the pinion gears 32, 32, and in turn, the side gears 33a–33c and 34 are rotated by the pinion gears 32, 32 to drive the slide shaft 37 and the drive pinion shaft 17. The slide shaft 37 acts to rotate the drive shaft 15 through the output and input gears 39 and 15a for transmitting the driving torque to the front axles 16d and 16e, while the drive pinion shaft 17 acts to transmit the driving torque to the rear axles 18a and 18b through the differential unit 13 for rear-wheel drive. Assuming that in such operation, the slide shaft 37 has been shifted to a backward position to engage the inner spline $33a_1$ of the first side gear 33a at its outer spline 37b, the first side gear 33a acts to transmit the driving torque to the drive shaft 15 through the slide shaft 37. As the diameter of the first side gear 33a is substantially the same as that of the side gear 34, the driving torque is distributed to the front and rear axles at a gear ratio of 1:1. When the slide shaft 37 is shifted to an intermediate position to engage the inner spline $33b_1$ of the second side gear 33b at its outer spline 37b, the second side gear 33b acts to transmit the driving torque to the drive shaft 15 through the slide shaft 37. As the diameter of the second side gear 33b is smaller than that of the side gear 34, the driving torque is distributed to the front and rear axles at a gear ratio between the side gears 33b and 34. When the slide shaft 37 is shifted to a forward position to engage the inner spline $33c_1$ of the third side gear 33c at its outer spline 37b, the third side gear 33c acts to transmit the driving torque to the drive shaft 15 through the slide shaft 37. As the diameter of the third side gear 33c is further smaller than that of the side gear 34, the driving torque is distributed to the front and rear axles at a gear ratio between the side gears 33c and 34.

From the above description, it will be understood that the intermediate differential unit 30a acts to change the distribution ratio of the driving torque at three steps in accordance with a road condition so as to ensure stable maneuverability of the vehicle. Furthermore, it will be understood that with the above arrangement of the intermediate differential unit 30a and shift mechanism 30b, the power transmission can be constructed in a relatively small size to be installed in a limited space of the vehicle.

Figure 4:
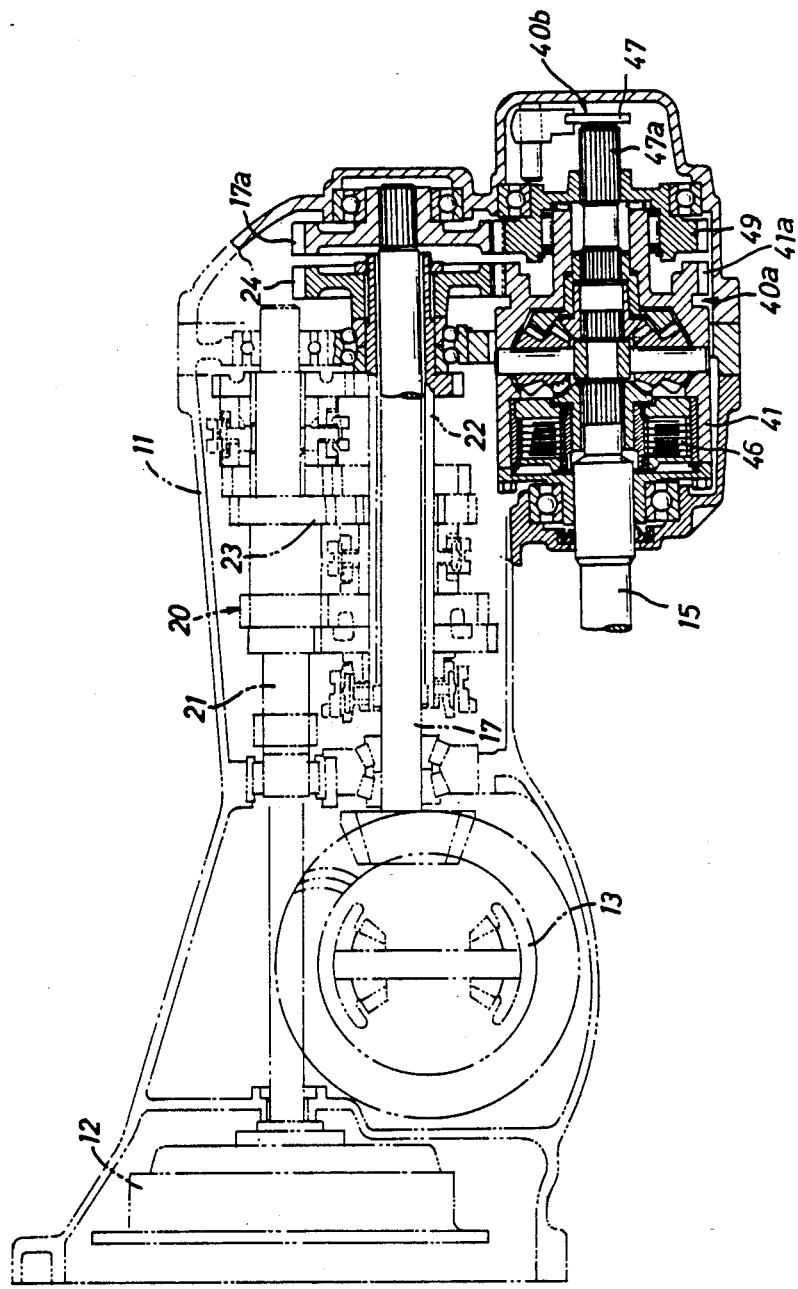
FIG. 4 is a sectional view of an intermediate differential unit assembled within another embodiment of the power transmission.
Figure 5:
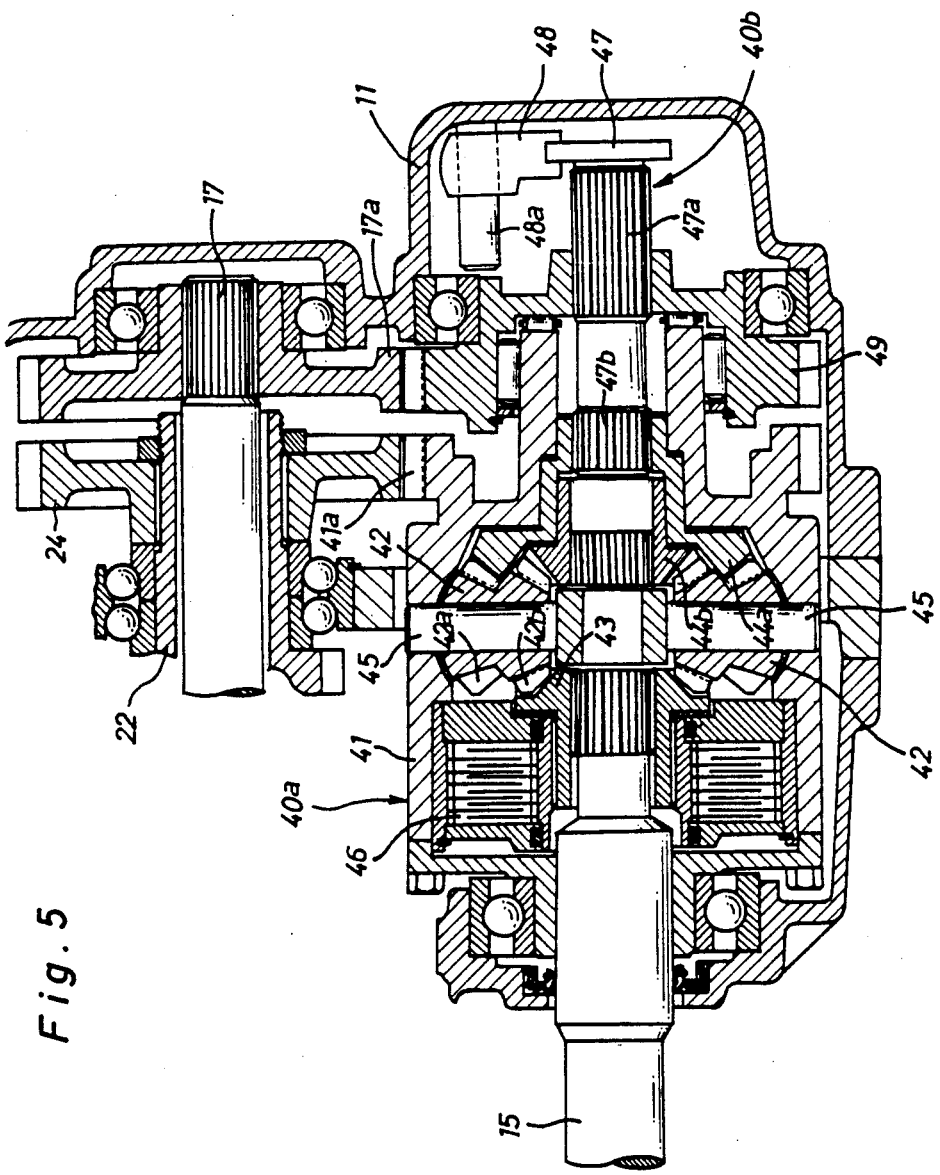
FIG. 5 is an enlarged sectional view of the intermediate differential unit of FIG. 4.

In FIGS. 4 and 5, there is illustrated another embodiment of the power transmission, wherein an intermediate differential unit 40a and a shift mechanism 40b are arranged in parallel with the output shaft 22 of change-speed gearing 20, and wherein a casing 41 of the intermediate differential unit 40a is drivingly connected to the output shaft 22 of change-speed gearing 20 by means of a pair of intermeshed gears 24 and 41a. The gear 24 is fixed to the output shaft 22 of change-speed gearing 20, and the gear 41a is integrally formed on the differential casing 41. In the intermediate differential unit 40a, a pair of pinion gears 42, 42 are rotatably supported on a pair of pinion shafts 45, 45 which are respectively carried on the casing 31. The pinion gears 42, 42 each are integrally formed with two stepped toothed portions 42a and 42b which are respectively in meshing engagement with first and second side gears 44a and 44b for rear-wheel drive. The respective toothed portions 42b of pinion gears 42 are permanently in meshing engagement with a small diameter side gear 43 for front-wheel drive which is fixed to the drive shaft 15. The side gears 44a and 44b for rear-wheel drive are formed in different diameter and are concentrically mounted within the casing 41 for relative rotation. In the above arrangement, the diameter of the first side gear 44a is larger than that of the second side gear 44b, and the diameter of side gear 43 for front-wheel drive is substantially the same as that of the second side gear 44b. Arranged between the casing 41 and the side gear 43 is a hydraulic restriction mechanism 46 which is adapted to restrict excessive relative rotation between the casing 41 and the side gear 43.

The shift mechanism 40b includes a slide shaft 47 arranged to be shifted by a lever 48. The slide shaft 47 is axially slidably disposed within sleeve portions of the side gears 44a, 44b through an output gear 49. The slide shaft 47 is formed thereon with axially spaced outer splines 47a and 47b, the former spline 47a being permanently engaged with an inner spline of the output gear 49, and the latter spline 47b being arranged to be selectively engaged with respective inner splines of the side gears 44a and 44b. The output gear 49 is rotatably supported from the transmission casing 11 and is permanently in meshing engagement with an input gear 17a fixed to the drive pinion shaft 17. The lever 48 is slidably mounted on an axial support shaft 48a fixed to the transmission casing 11 and operatively connected through an appropriate linkage (not shown) to a manual shift lever which is arranged in the vehicle compartment to be operated by an operator.

In operation of the intermediate differential unit 40a, the casing 41 is rotated by the driving torque applied thereto from the output shaft 22 of change-speed gearing 20 through the intermeshed gears 24, 41a to drive the pinion gears 42, 42, and in turn, the side gears 43, 44a and 44b are rotated by the pinion gears 42, 42 to drive the drive shaft 15 and the slide shaft 47. The drive shaft 15 acts to transmit the driving torque to the front axles 16d and 16e through the inversion mechanism 16a, propeller shaft 16b and differential unit 16c, while the slide shaft 47 acts to rotate the drive pinion shaft 17 through the output and input gears 49 and 17a for transmitting the driving torque to the rear axles 18a and 18b through the differential unit 13. Assuming that in such operation, the slide shaft 47 has been shifted to a backward position to engage the inner spline of the first side gear 44a at its outer spline 47b, the first side gear 44a acts to transmit the driving torque to the drive pinion shaft 17 through the slide shaft 47. Thus, the driving torque is distributed to the front and rear axles at a gear ratio between the side gears 43 and 44a.

When the slide shaft 47 is shifted to a forward position to engage the inner spline of the second side gear 44b at its outer spline 47b, the second side gear 44b acts to transmit the driving torque to the drive pinion shaft 17 through the slide shaft 47. Thus, the driving torque is distributed to the front and rear axles at a gear ratio of 1:1 because the diameter of side gear 44b is substantially the same as that of the side gear 43 for front-wheel drive. From the above description, it will be understood that the intermediate differential unit 40a acts to change the distribution ratio of the driving torque at two steps in accordance with a road condition so as to ensure stable maneuverability of the vehicle. In this embodiment, it is advantageous that the power transmission can be constructed in a relatively short length owing to the parallel arrangement of the intermediate differential unit 40a in relation to the change-speed gearing 20.

Figure 6:
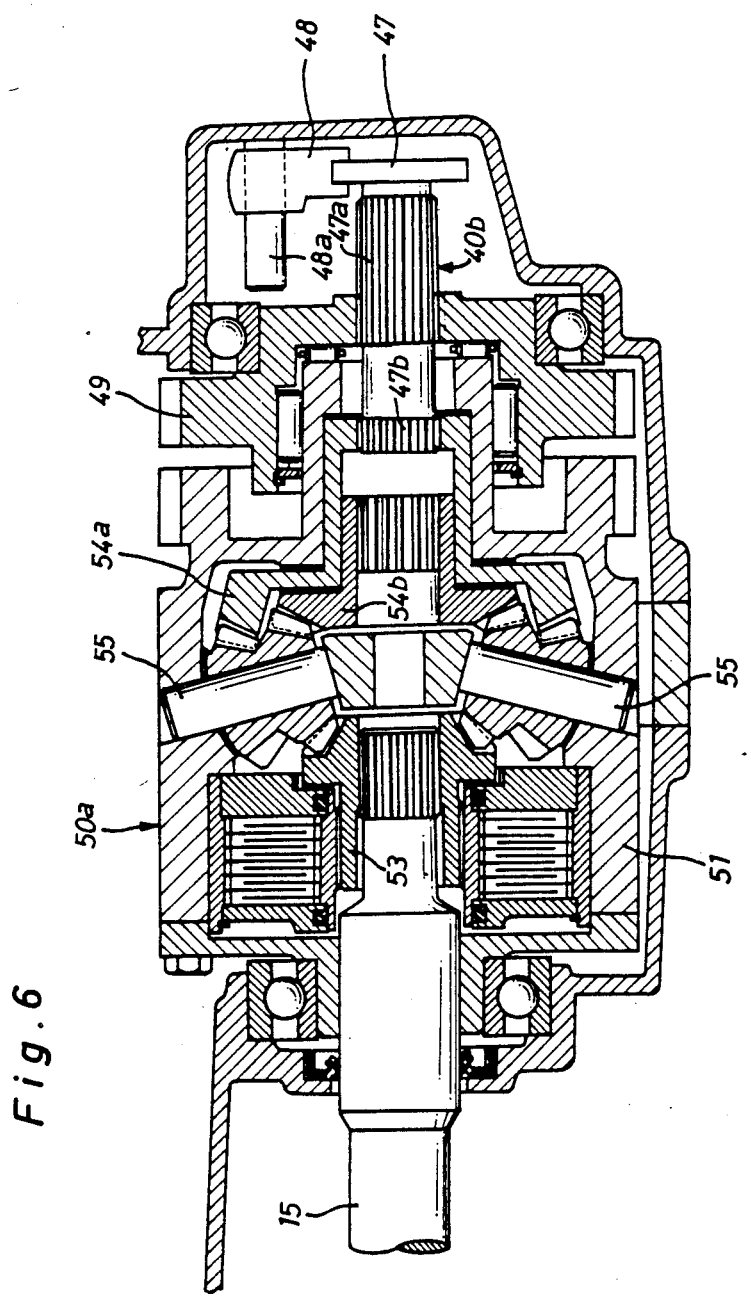
FIG. 6 is an enlarged sectional view of a modification of the intermediate differential unit of FIG. 4.

In FIG. 6, a modification of the intermediate differential unit 40a is designated by the reference numeral 50a, wherein the pinion shafts 45, 45 of unit 40a are replaced with a pair of inclined pinion shafts 55, 55 carried on a differential casing 51 at an angle, and wherein the side gears 44a, 44b of unit 40a are replaced with side gears 54a, 54b concentrically assembled within the differential casing 51. In this modification, both the side gears 54a, 54b are formed larger in diameter than a side gear 53 for front-wheel drive. The other construction of the differential unit 50a is substantially the same as that of the differential unit 40a shown in FIGS. 4 and 5. In operation of the differential unit 50a, the driving torque applied from the output shaft 22 of change-speed gearing 20 is distributed to the front and rear axles at a gear ratio between the side gears 53 and 54a or 54b. When the slide shaft 47 is shifted to engage the inner splines of side gears 54a and 54b at its outer splines 47a and 47b, the differential unit 50a is locked by interconnection of the side gears 54a and 54b without provision of any locking mechanism.

Although certain specific embodiments of the present invention have been shown and described, it is obvious that many modifications and variations thereof are possible in light of these teachings. It is to be understood, therefore, that within the scope of the appended claims, the invention may be practiced otherwise than as specifically described herein.

What is claimed is:

1. A power transmission for a four-wheel drive vehicle including a transmission casing arranged to be secured to a cylinder block of a prime mover of the vehicle, a change-speed gearing mounted within said transmission casing and having an input shaft drivingly connected to an output shaft of said prime mover, and an intermediate differential unit assembled within said transmission casing and drivingly connected to an output shaft of said change-speed gearing to be applied with a driving torque from said prime mover through said change-speed gearing for transmitting the driving torque to a first drive shaft for front-wheel drive and to a second drive shaft for rear-wheel drive, said intermediate differential unit comprising:
a differential casing rotatably mounted within said transmission casing and drivingly connected to the output shaft of said change-speed gearing for rotation therewith;
a pinion gear integrally formed with a plurality of stepped toothed portions and being rotatably mounted within said differential casing;
a plurality of first side gears concentrically mounted within said differential casing for relative rotation and being in meshing engagement with the respective toothed portions of said pinion gear, said first side gears being formed with different diameters and arranged to be drivingly connected to one of said drive shafts;
a second side gear arranged coaxially with said first side gears and being rotatably mounted within said differential casing, said second side gear being in meshing engagement with one of the toothed portions of said pinion gear and drivingly connected to the other drive shaft;
an output gear arranged coaxially with said first side gears and being rotatably mounted on said differential casing for drive connection to the one of said drive shafts; and a shift mechanism including a slide shaft slidably disposed within respective coaxial sleeve portions of said first side gears through said output gear, said slide shaft being drivingly connected to the one of said drive shafts through said output gear and being arranged to be selectively engaged with the coaxial sleeve portions of said first side gears.

2. A power transmission as claimed in claim 1, wherein the output shaft of said change-speed gearing comprises a hollow shaft arranged in surrounding relationship with said second drive shaft, and said first drive shaft is arranged in parallel with the output shaft of said change-speed gearing, and wherein said differential casing is arranged in parallel with the output shaft of said change-speed gearing, said second side gear is drivingly connected to said first drive shaft, and said slide shaft of said shift mechanism is drivingly connected to said second drive shaft through said output gear.

3. A power transmission as claimed in claim 1, further comprising a restriction mechanism assembled between said differential casing and said second side gear to restrict excessive relative rotation between said casing and said second side gear.

4. A power transmission for a four-wheel drive vehicle equipped with a prime mover at an intermediate portion thereof, said power transmission including a transmission casing arranged to be secured to a cylinder block of said prime mover, a change-speed gearing mounted within said transmission casing and having an input shaft drivingly connected to an output shaft of said prime mover and an output shaft arranged in parallel with the input shaft, and an intermediate differential unit assembled within said transmission casing and drivingly connected to the output shaft of said change-speed gearing to be applied with a driving torque from said prime mover through said change-speed gearing for distributing the driving torque to a first drive shaft for front-wheel drive and to a second drive shaft for rear-wheel drive, said intermediate differential unit comprising:

a differential casing rotatably mounted within said transmission casing and drivingly connected to the output shaft of said change-speed gearing for rotation therewith;

a pair of pinion gears rotatably mounted within said differential casing, said pinion gears each being integrally formed with a plurality of stepped toothed portions;

a plurality of first side gears concentrically mounted within said differential casing for relative rotation and being in meshing engagement with the respective toothed portions of said pinion gears, said first side gears being formed with different diameters and arranged to be drivingly connected to one of said drive shafts;

a second side gear arranged coaxially with said first side gears and being rotatably mounted within said differential casing, said second side gear being in meshing engagement with a pair of toothed portions of said pinion gears and drivingly connected to the other drive shaft;

an output gear arranged coaxially with said first side gears and being rotatably mounted on said differential casing for drive connection to the one of said drive shafts; and a shift mechanism including a slide shaft slidably disposed within respective coaxial sleeve portions of said first side gears through said output gear, said slide shaft being drivingly connected to the one of said drive shafts through said output gear and being arranged to be selectively engaged with the coaxial sleeve portions of said first side gears.

5. A power transmission as claimed in claim 4, further comprising a restriction mechanism assembled between said differential casing and said second side gear to restrict excessive relative rotation between said casing and said second side gear.

* * * * *